US005583509A

United States Patent [19]

Hynes et al.

[11] Patent Number: 5,583,509

[45] Date of Patent: Dec. 10, 1996

[54] COMMUNICATIONS ELECTRONIC WARFARE TRAINER

[75] Inventors: Mark W. Hynes, Sierra Vista; James L. Cole, Tucson; Garrett W. Conover; Michael J. O'Connor, both of Sierra Vista, all of Ariz.

[73] Assignee: The United States of America as represented by the Secretary of the Army, Washington, D.C.

[21] Appl. No.: 504,304

[22] Filed: Jul. 20, 1995

[51] Int. Cl.[6] .................................. G01S 7/38; H04K 3/00

[52] U.S. Cl. .................................. 342/169; 434/2; 342/15

[58] Field of Search .................................. 342/169, 170, 342/171, 13, 14, 15; 434/2

[56] References Cited

U.S. PATENT DOCUMENTS

| | | | |
|---|---|---|---|
| 4,192,082 | 3/1980 | Deaton et al. | 434/2 |
| 4,666,407 | 5/1987 | Jones | 434/2 |
| 5,010,342 | 8/1991 | Jones, Jr. | 342/169 |
| 5,133,663 | 7/1992 | Willingham et al. | 434/2 |
| 5,134,412 | 7/1992 | Baseghi et al. | 342/169 |
| 5,150,127 | 9/1992 | Aw | 342/169 |
| 5,341,146 | 8/1994 | Vennum et al. | 342/170 |

*Primary Examiner*—John B. Sotomayor
*Attorney, Agent, or Firm*—William R. Medsger; Saul Elbaum

[57] ABSTRACT

A communications electronic warfare trainer that includes apparatus and a method by which a training umpire can control the localized jamming of a victim communications system. A control signal containing an address and duration of jamming is generated and transmitted using the same frequency as the victim communications system. The control signal is processed by a Receiver Unit collocated with the victim communications system to determine if the control signal address matches the address of the victim communications system. If an address match is found, a jamming signal is produced for the specified duration causing disruption of the normal operation of the victim communications system.

18 Claims, 6 Drawing Sheets

COMMUNICATIONS ELECTRONIC WARFARE TRAINER

BACKGROUND OF THE INVENTION

1. Field of the Invention

This invention relates to electronic warfare simulation, and more particularly to a method and apparatus for simulating a localized jamming signal in a victim communications system.

2. Description of the Related Art

Electronic warfare jamming equipment is well known in the prior art. The most common communications electronic warfare jamming equipment configuration includes an apparatus for generating and transmitting a jamming signal characterized by a high powered radio frequency waveform that when received by a victim communication system results in interfering noise and disturbance. The jamming signal results in varying levels of disruption of the normal capability of the victim communications system. The jamming signal may render intended communications received by the victim communications system unintelligible or may merely cause distracting interference. Nonetheless, the jamming signal affects the optimal performance of the victim communications system.

Electronic warfare is an integral component of the warfighting doctrine of U.S. Armed Forces, as it for the armed forces of most other nations. Military communications equipment is suspectable to electronic jamming to varying degrees. Accordingly, military personnel who operate and rely upon communications equipment must be trained to react when their communications equipment is jammed. Thus, a need exists for electronic warfare equipment that will simulate the effects of enemy jamming equipment.

Several devices exist in the prior art that can be used to simulate electronic jamming signals, however, all have distinct disadvantages. The technique most frequently used is simply to take the friendly force's electronic warfare jamming equipment, which is intended to jam enemy communications systems, and turn that jamming equipment against its own communications systems. However, this has several significant disadvantages.

First, these electronic jammers are not address directable so as to interfere only with a specific intended victim communications system, but will often jam other communication systems of friendly forces within the vicinity operating on like frequencies. Second, because these jammers operate on frequencies besides the victim communications systems, there is a need to obtain additional frequency clearances before training may commence. Third, these jammers frequently operate on frequencies that cause interference with electronic devices other than the intended victim communications systems. Thus, often training must be conducted in remote locations or late at night to reduce the probability of interference with other electronic systems. Fourth, these jammers can be expensive to operate and maintain because they operate at high power outputs and are frequently large and unwieldy.

There exists a need for an electronic warfare jamming simulator that overcomes the above stated disadvantages. There is especially a great need in a training scenario in which the training umpire desires to jam only specific friendly forces communications systems operating on a common communications network. For example, soldiers may be conducting warfighting field exercises in a localized geographic area. The forces may be communicating with each other over a communication network operating on a common frequency. There may be numerous individual communications systems operating on the network. The training umpire may desire to jam only one communications system on the network or several, but not all of the communications systems. Therefore, the training umpire needs the flexibility to identify the specific communications systems he wants to jam and the duration that each communications system will be jammed.

One recent addition to the prior art known as the Covert Remote Electronic Warfare Simulator (CREWS) overcomes some of the previously identified disadvantages, but not all of them. The CREWS eliminates the need to transmit a high power jamming waveform because the CREWS instead uses a transmitted low powered, continuous wave control signal to control the level of a locally generated jamming signal at the location of the victim communications system which is then injected into the victim communications system. The CREWS also includes apparatus for the storage, subsequent retrieval and replay of resulting time tagged signals for data collection and detailed analysis in a laboratory setting. While the CREWS overcomes some of the prior art problems including large size, high power outputs, and some unintentional interference with other RF systems not undergoing testing, the CREWS does not overcome all of the prior art shortcomings. More important, the CREWS is not suitable for the training scenario discussed above for which the present invention is to be used. The CREWS is not a low cost, address directable training jammer system, but rather is a more expensive, complex training and testing jammer, not suitable for the described training scenario.

Therefore, a need exists for a low cost training jammer method and apparatus which overcomes all of the shortcomings identified above. The present invention satisfies this need.

SUMMARY OF THE INVENTION

The present invention includes a method and apparatus directed at controlling the localized jamming of a victim communications system for training purposes. The present invention includes a method that allows a training umpire to control the jamming of friendly communications systems on a common communications network. The training umpire can control which communications systems are jammed and the duration of the jamming.

The training umpire controls the jamming through the use of a Master Control Unit. The training umpire inputs the address of the communication system(s) to be jammed and the duration of desired jamming. The Master Control Unit generates an encoded control signal containing the address and jamming duration information. The control signal is then transmitted and received by a Receiver Unit. The Receiver Unit decodes the control signal into digital words. The Receiver Unit compares the digital address of the control signal with the digital address of the victim communications system. If an address match is found, the Receiving Unit turns on a jammer source for the duration of time entered by the training umpire. The jamming signal disrupts the normal operation of the victim communications system.

Further objects, features, and advantages of the present invention will become apparent from the following description and drawings of the presently preferred embodiment of the invention.

DESCRIPTION OF THE PREFERRED EMBODIMENT

Figure 1A:
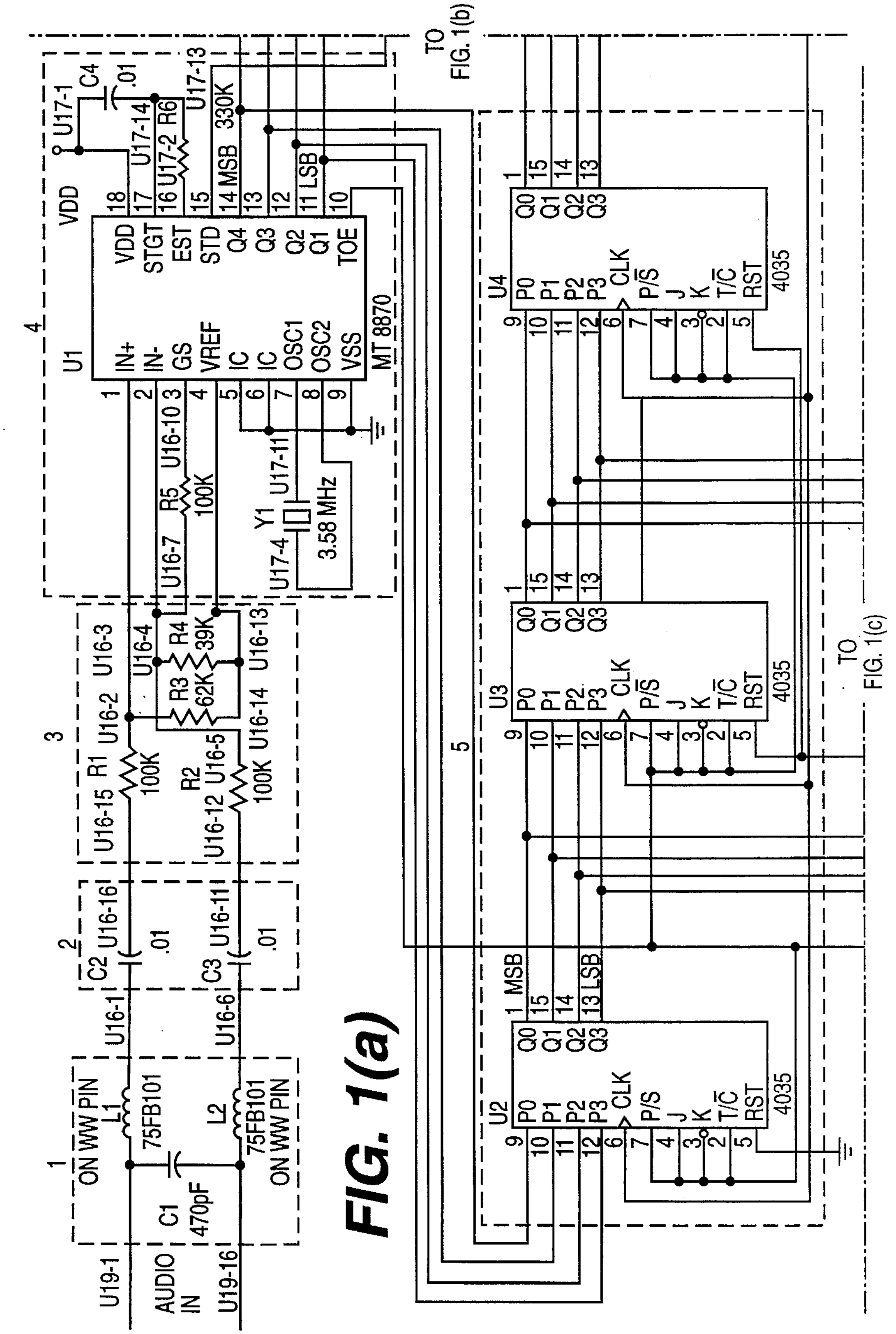
FIG. 1 (*a*), (*b*), (*c*), (*d*), & (*e*) is a schematic diagram of the Receiver Unit of the preferred embodiment of the present invention.
Figure 1B:
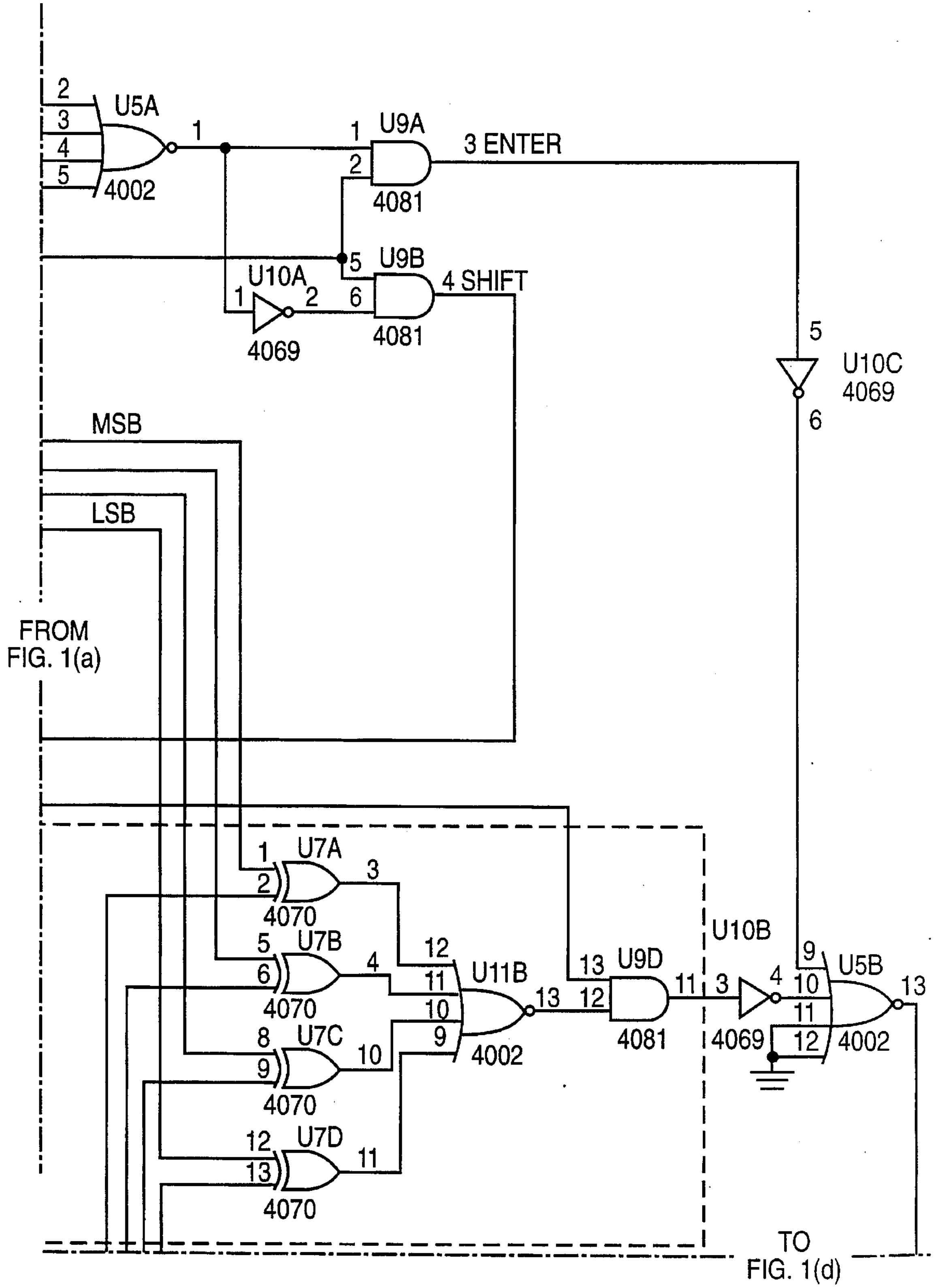
Figure 1C:
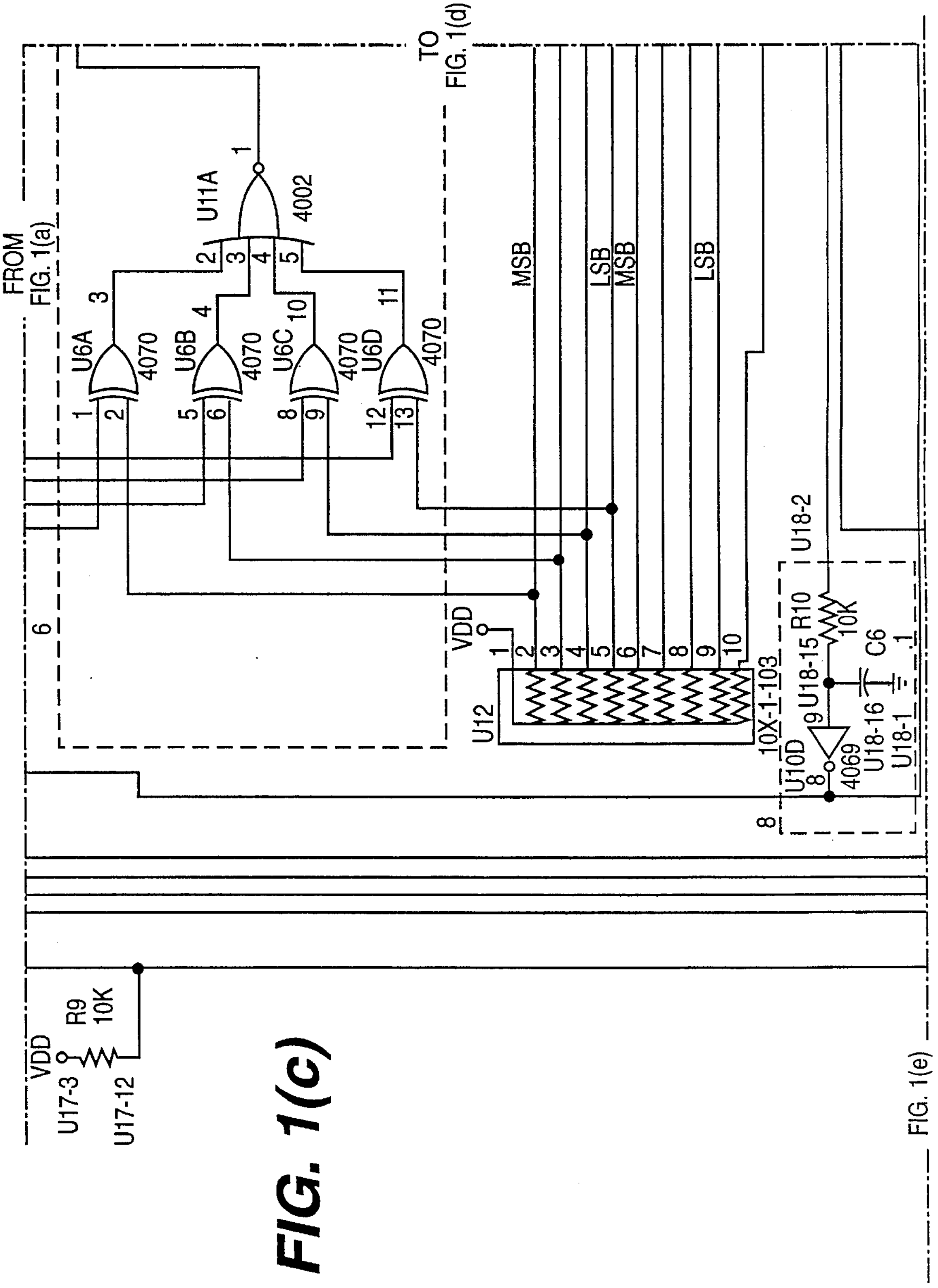
Figure 1D:
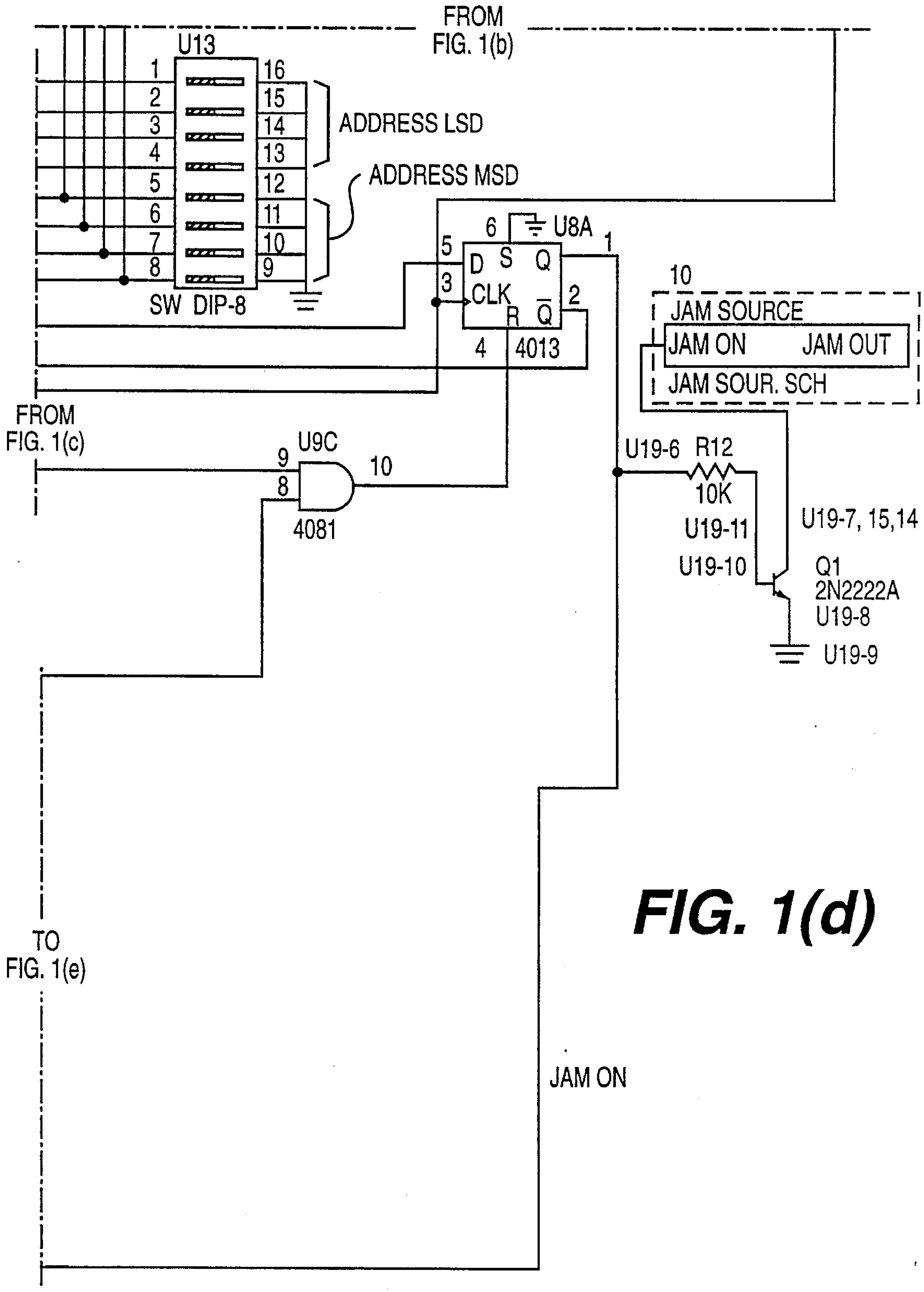
Figure 1E:
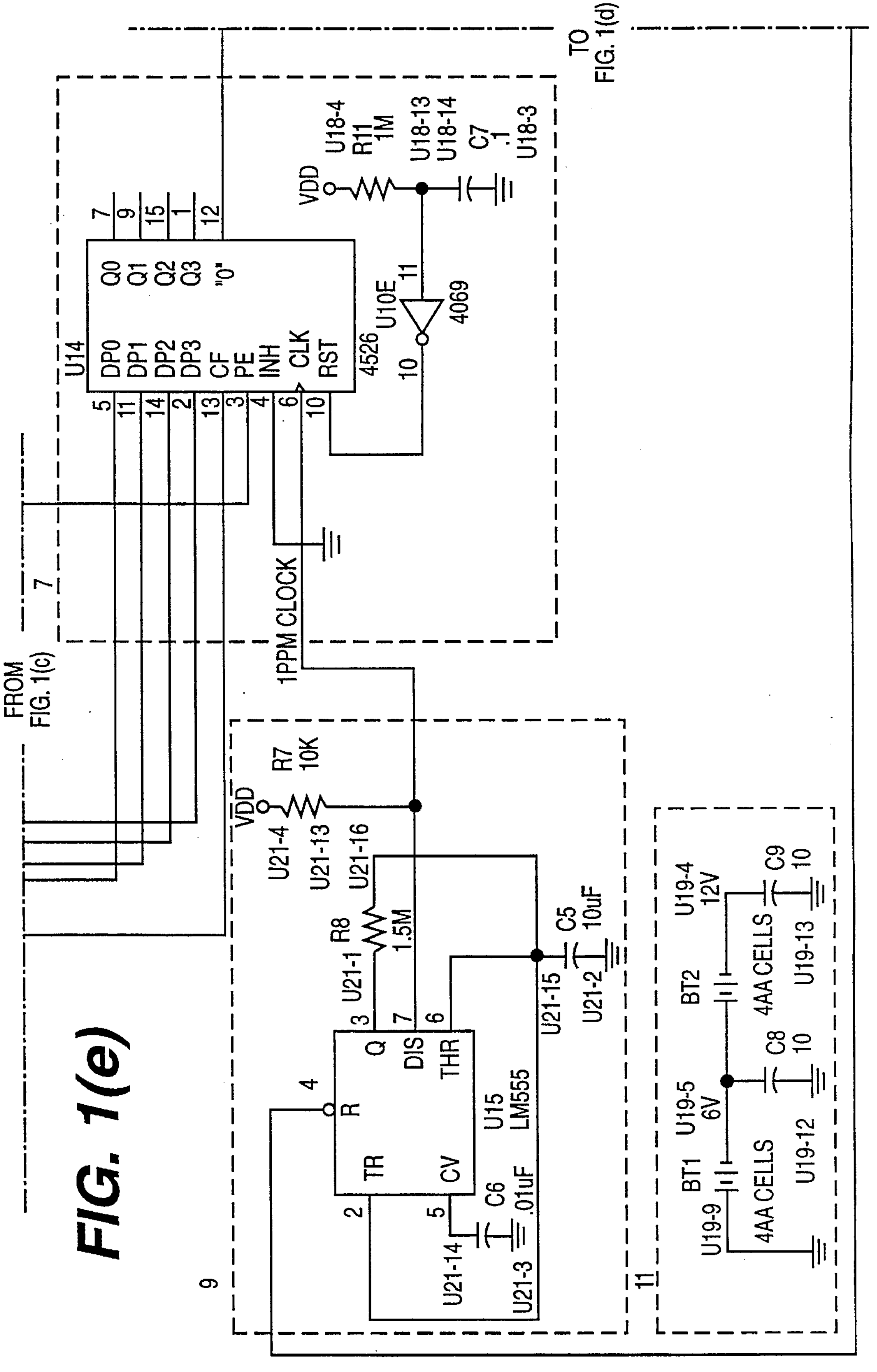

In the preferred embodiment of the present invention, the communications electronic warfare trainer comprises two major components: the Master Control Unit and the Receiver Unit. The Master Control Unit is used by the training umpire to control which victim communications systems in the communications network are to be jammed and the jamming duration. The Master Control Unit comprises a TRANSMIT key, a hex keypad, a Dual Tone Modulated Frequency (DTMF) encoder, and internal power source. The Transmit key serves two purposes. First, when the TRANSMIT key is pressed, a ground is connected to the umpire's communications system key control line causing the umpire's communications system to transmit the baseband signal present on the umpire's communications system's audio line. Second, pressing the TRANSMIT key supplies power to the DTMF encoder chip, whose output is connected to the audio input line of the umpire's communications system causing transmission of the code representative of each keypad digit pressed by the umpire on the keypad connected to the input of the DTMF encoder. The Master Control Unit is readily understood and easily constructed by a person with ordinary skill in the art.

To initiate jamming of a victim communications system or a group of systems in a communications network operating on a common frequency, the training umpire presses the TRANSMIT key on the Master Control Unit followed by the two digit address of the victim communications system(s) to be jammed, then presses the one digit jamming duration followed by the ENTER key. The control signal containing this information is fed into the umpire's communications system and transmitted by that system using the same frequency as the receiver of the victim communications system.

Referring to FIG. 1(*a*), (*b*), (*c*), (*d*), & (*e*), the control signal is received and demodulated by the victim communications system (not shown) generating an audio output signal. The audio output signal is carried by a feedline (not shown) connected to a normal audio output jack on the victim communications system to the Receiver Unit input. In the preferred embodiment of the present invention, the Receiver Unit is external to the victim communications system, although it could also be an integral component of the victim communications system. Also, in the preferred embodiment, the Receiver Unit is powered by a 12 volt direct current power supply depicted in Block 11 comprising 8 commercially available AA cell batteries, although other power means could also be employed. The audio signal passes through the feedline and into Block 1 which is a bandpass filter comprising capacitor C1 and inductors L1 and L2. The filter minimizes the amount of out-of-band noise of the audio signal inputted into Dual Tone Modulated Frequency (DTMF) decoder U1. From Block 1 the signal passes into Block 2 comprising capacitors C2 and C3, which are direct current (DC) blocks. The signal next passes into Block 3, comprised of resistors R1, R2, R3, and R4, which also set the differential input to the DTMF decoder U1 of Block 4 to mid rail, which allows for maximum swing at this point. Resister R5 of Block 4 sets the gain of an operational amplifier internal to DTMF decoder U1 to unity. Crystal Y1 of Block 4 sets the internal clock rate of the DTMF decoder U1 to 3.58 MHz.

The output audio signal from Block 3 is inputted into Block 4 that includes the DTMF decoder U1. The DTMF decoder U1 decodes the input signal by splitting and filtering the input signal into two frequency ranges, the low band and the high band. The two signals are then limited and fed into zero crossing detectors. The two outputs from the detectors are fed into frequency counters and digital detection circuitry which determines whether two valid frequencies exist simultaneously. If two valid frequencies are detected, the code of the detected pair is set on outputs Q1 through Q4 of DTMF decoder U1 and the EST output of DTMF decoder U1 is asserted. After a delay that is determined by capacitor C4 and resistor R6 of Block 4, the delayed output, STD of DTMF U1, is asserted. At this point, a valid input digit has been detected and either an enter or shift operation will occur depending on the value of the code (Q1 through Q4 of DTMF decoder U1) detected. A code of zero indicates an enter operation and a nonzero code indicates a shift operation.

To jam a victim communications system, the training umpire normally enters three digits followed by an ENTER command on the Master Control Unit. These digits appearing on outputs Q1 through Q4 of DTMF decoder U1 are shifted through an array of shift registers in Block 5. When the training umpire presses a first digit, the first digit is shifted into J/K flip-flop U2. When the first digit is pressed and the STD line of DTMF decoder U1 is asserted, the output of AND gate U9B is asserted because the output of the NOR gate U5A is low due to the nonzero code. The output of AND gate U9B is connected to the clock inputs of J/K flip-flops U2, U3, and U4. The output of DTMF decoder U1 (Q1 through Q4) is thus shifted to J/K flip-flop U2; the output of J/K flip-flop U2 is shifted to J/K flip-flop U3; and the output of J/K flip-flop U3 is shifted to flip-flop U4; continuing until the first, second, and third digits are present on the outputs of J/K flip-flops U4, U3, and U2, respectively.

The outputs of J/K flip-flops U4 and U3 represent the most significant digit (MSD) and the least significant digit (LSD) of the victim communications system address respectively. The value of the victim communications system address is determined by setting dual inline package (DIP) switch U13, which is connected to pull-up resistors U12. Block 6 comprises an arrangement of logic gates which determine if the address set on DIP switch U13 matches the MSD and LSD of the address of J/K flip-flops U4 and U3 of Block 5. The exclusive OR gates U6A through U6D compare the address set on DIP switch U13 to the LSD of the address that has been shifted into J/K flip-flop U3. If an address match occurs, the output of NOR gate U11A is asserted. Likewise, the exclusive OR gates U7A through U7D compare the address set on the DIP switch U13 to the MSD of the address shifted into J/K flip-flop U4. If an address match occurs, the output of NOR gate 11B is asserted and in turn the output of AND gate U9D is asserted and the output of inverter U10B is deasserted. This state only occurs when an address match is found and one digit representing the jamming duration has been sensed.

When an ENTER command is pressed by the training umpire on the Master Control Unit, a jammer source (Block 10) is turned on because when ENTER is pressed, the detected zero code at DTMF U1 will assert the output of AND gate U5A and the STD line of DTMF U1 is asserted thus asserting the AND gate U9A causing the deassertion of the output of inverter U10C. Because as stated previously the output of AND gate U10B is also deasserted, NOR gate U5B is asserted. The output of NOR gate U5B is connected to the program enable input of down counter U14 of Block 7.

The time present at the input of down counter U14 is loaded into the down counter and the countdown commences. The clock input to D flip-flop USA is simultaneously asserted causing logic 1 to appear at output Q of D flip-flop U8A. This turns on transistor Q1 which is connected to the jammer source of Block 10 and thus turns on the jammer source. The jammer source is turned on until down counter U14 reaches zero and resets D flip-flop U8A turning off the jammer source.

The circuit of Block 8, comprising capacitor C8, inverter U10D and resister R10, prevents feedback when J/K flip-flops U2, U3, and U4 are reset when the jammer source is turned on. The circuit of Block 9, comprising a general purpose timer U15, capacitors C5 and C6, and resisters R7 and R8 make up a basic 1 pulse per minute (PPM) clock that is used by down counter U14.

Figure 2:
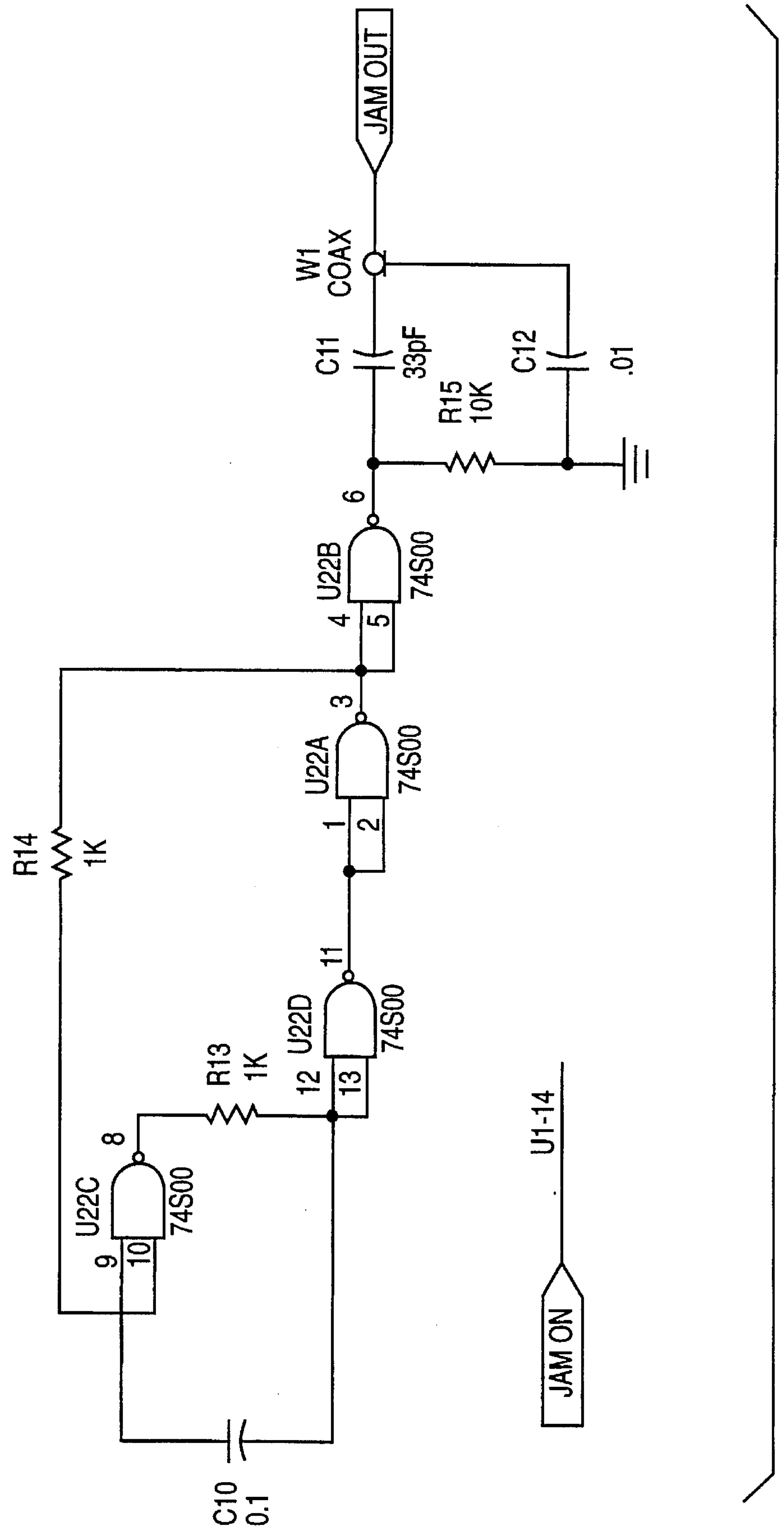
FIG. 2 is a schematic diagram depicting the jammer source of the preferred embodiment of the present invention.

The jammer source of Block 10 is depicted in detail in FIG. 2. The jammer source generates a jamming signal by running a NAND gate in feedback mode which generates a series of very closely spaced step functions. The resulting frequency components extend across the frequency range of interest. The inputs to all of the NAND gates on chip U22 are tied together to effect inverters. The jamming signal begins at NAND gate U22C. The inverted signal from NAND gate U1C is fed through resister R13 to NAND gate U22D where it is inverted again and finally to NAND gate U22B where it is inverted again. When the signal at the input of NAND gate U22C goes high, the signal at the output of NAND gate U22A goes low. At this point in time, capacitor C10 connected to the inputs of NAND gates U22C and U22D will start to discharge until NAND gate U22C changes state and the output of NAND gate U22A goes high. The NAND gates will continue to oscillate in this manner at a very high rate as determined by resister R13 connected to the output of NAND gate U22C and the input of U22D and by capacitor C10 connected to the input of NAND gate U22C and the input of NAND gate U22B. NAND gate U22B, which is connected to the input of NAND gate U22C and the output of NAND gate U22A, the capacitors C11 and C12 and resister R15, all of which are connected to the output of NAND gate U22B, are used to buffer the jamming signal and isolate the circuit from effects of loading from the circuit to which the output is connected. The resulting jamming signal output is an effective broadband noise jammer in the 30 MHz to 88 MHz frequency range in the preferred embodiment.

In the preferred embodiment, the output jamming signal is coupled into the victim communication system by means of a coaxial cable (not shown) connected at one end to the output of the jammer source and at the other end coupled to the antenna of the victim communications system's receiver (not shown). The noise received by the victim antenna disrupts the normal operation of the communications system's reception.

Although certain presently preferred embodiments of the invention have been described herein, it will be apparent to those skilled in the art to which the invention pertains that variations and modifications of the described embodiment may be made without departing from the spirit and scope of the invention. For example, although in the preferred embodiment the present invention is employed in a radio communications network configuration, the present invention could also be employed in a wire communications network configuration. In that configuration, the encoded signal would be transmitted from the Master Control Unit and received by the Receiver Unit by wire means, instead of by radio wave means. Accordingly, the invention herein is not to be construed as being limited, except insofar as expressly provided for or as the claims may require.

What is claimed:

1. A method of jamming a victim communications system, comprising:

generating and transmitting an encoded control signal which contains information as to the address of the victim communications system to be jammed;

receiving said control signal;

decoding said received control signal into a digital signal;

comparing said digital signal to the address of the victim communications system; and producing a jamming signal if an address match occurs.

2. A method of jamming a victim communications system as recited in claim 1, further comprising:

modulating said encoded control signal; and demodulating said encoded control signal.

3. A method of jamming a victim communications system as recited in claim 1, wherein said received signal is passed through a bandpass filter to minimize out-of-band noise.

4. A method of jamming a victim communications system as recited in claim 2, wherein said received signal is passed through a bandpass filter to minimize out-of-band noise.

5. A method of jamming a victim communications system, as recited in claim 1, wherein:

said encoded control signal includes information concerning the duration of time that the victim communications system is to be jammed; and said jamming signal is produced for said duration of time.

6. A method of jamming a victim communications system, as recited in claim 2, wherein:

said encoded control signal includes information concerning the duration of time that the victim communications system is to be jammed; and said jamming signal is produced for said duration of time.

7. A method of jamming a victim communications system, as recited in claim 3, wherein:

said encoded control signal includes information concerning the duration of time that the victim communications system is to be jammed; and said jamming signal is produced for said duration of time.

8. A method of jamming a victim communications system, as recited in claim 4, wherein:

said encoded control signal includes information concerning the duration of time that the victim communications system is to be jammed; and said jamming signal is produced for said duration of time.

9. A method of jamming a victim communications system as recited in claim 1, 2, 3, 4, 5, 6, 7, or 8, wherein said jamming signal is produced in the 30 MHz to 88 MHz frequency range.

10. A communications electronic warfare trainer, comprising:

means for generating and transmitting an encoded control signal which contains information as to the address of the victim communications system;

means for receiving said control signal;

means for decoding said received control signal into a digital signal;

means for comparing said digital signal to the address of the victim communications system; and means for producing a jamming signal if an address match occurs.

11. A communications electronic warfare trainer as recited in claim 10, further comprising:

means for modulating said encoded control signal; and means for demodulating said encoded control signal.

12. A communications electronic warfare trainer as recited in claim 10, further comprising means for minimizing out-of-band noise of said received signal.

13. A communications electronic warfare trainer as recited in claim 11, further comprising means for minimizing out-of-band noise of said received signal.

14. A communications electronic warfare trainer as recited in claim 10, further comprising:

means for encoding said control signal with information concerning a duration of time that the victim communications system is to be jammed; and means for producing said jamming signal for said duration of time.

15. A communications electronic warfare trainer as recited in claim 11, further comprising:

means for encoding said control signal with information concerning a duration of time that the victim communications system is to be jammed; and means for producing said jamming signal for said duration of time.

16. A communications electronic warfare trainer as recited in claim 12, further comprising:

means for encoding said control signal with information concerning a duration of time that the victim communications system is to be jammed; and means for producing said jamming signal for said duration of time.

17. A communications electronic warfare trainer as recited in claim 13, further comprising:

means for encoding said control signal with information concerning a duration of time that the victim communications system is to be jammed; and means for producing said jamming signal for said duration of time.

18. A communication electronic warfare trainer as recited in claim 10, 11, 12, 13, 14, 15, 16, or 17, wherein said jamming signal is in the 30 to 88 MHz frequency range.

* * * * *